US006625258B1

United States Patent
Ram et al.

(10) Patent No.: US 6,625,258 B1
(45) Date of Patent: Sep. 23, 2003

(54) SYSTEM AND METHOD FOR PROVIDING UNIFIED COMMUNICATION SERVICES SUPPORT

(75) Inventors: Geetha Ram, Plano, TX (US); Lien K. Tran, Allen, TX (US); Charles G. Roberts, Richardson, TX (US)

(73) Assignee: Nortel Networks LTD, St. Laurent (CA)

( * ) Notice: Subject to any disclaimer, the term of this patent is extended or adjusted under 35 U.S.C. 154(b) by 0 days.

(21) Appl. No.: 09/472,627

(22) Filed: Dec. 27, 1999

(51) Int. Cl.[7] .............................................. H04M 1/64
(52) U.S. Cl. ............................. 379/88.13; 379/373.01; 379/88.17
(58) Field of Search .................. 379/67.1, 88.13–88.15, 379/88.17, 0.18, 88.22–88.28, 201.01–201.05, 201.06, 0.09, 201.12, 202.01, 203.01, 204.01, 205.01, 206.01, 207.01, 210.01, 211.01–211.03, 212.01, 218.01, 265.01, 0.02, 265.09, 372, 373.01; 370/351–354, 400, 401

(56) References Cited

U.S. PATENT DOCUMENTS

| | | | | |
|---|---|---|---|---|
| 5,333,266 A | * | 7/1994 | Boaz et al. ................... 709/206 |
| 5,524,137 A | * | 6/1996 | Rhee ........................ 379/88.01 |
| 5,740,230 A | * | 4/1998 | Vaudreuil ................. 379/88.22 |
| 5,742,905 A | * | 4/1998 | Pepe et al. .................... 455/461 |
| 5,867,495 A | * | 2/1999 | Elliott et al. ................. 370/352 |
| 5,987,100 A | * | 11/1999 | Fortman et al. .......... 379/88.14 |
| 5,991,365 A | * | 11/1999 | Pizano et al. ............. 379/88.13 |
| 6,047,053 A | * | 4/2000 | Miner et al. ............. 379/201.01 |
| 6,064,666 A | * | 5/2000 | Willner et al. .............. 370/352 |
| 6,072,862 A | * | 6/2000 | Srinivasan ............. 379/100.08 |
| 6,085,231 A | * | 7/2000 | Agraharam et al. ......... 709/206 |
| 6,192,111 B1 | * | 2/2001 | Wu .......................... 379/88.13 |
| 6,330,079 B1 | * | 12/2001 | Dugan et al. ................ 358/403 |
| 6,373,926 B1 | * | 4/2002 | Foladare et al. ......... 379/88.13 |
| 6,393,017 B1 | * | 5/2002 | Galvin et al. ................ 370/352 |
| 6,421,707 B1 | * | 7/2002 | Miller et al. ................. 358/403 |

\* cited by examiner

Primary Examiner—Fan Tsang
Assistant Examiner—Roland G. Foster
(74) Attorney, Agent, or Firm—Bruce Garlick

(57) ABSTRACT

A virtual assistant system (VAS) (102) supports call services (104), message services (106) and profile services (108) and interfaces to both a telephone network (114) and to a data network (116). The telephone network (114) may be the PSTN and/or another telephone network. The data network (116) may be the Internet, an Intranet or another data network in which communications are packet based. The call services (104) include call receipt services, call initiation services, conference calling services and other types of services in which calls are initiated, routed and/or completed and that are typically provided by a telephone company. The message services (106) include voice mail, email, Faxes, video mail, and other types of messages that include one or more types of media, e.g., audio or visual. The profile services (108) uniquely identify each subscriber and provide contact information for the subscriber. [All communications (email, voice mail, Fax, etc.) for the subscriber are received via a single telephone number. For example, the subscriber has account 8001234567 for calls, voice mail, Fax, IP calls, etc. and 80012345678@VAS.com for email. Based upon the content of the reach lists and corresponding schedules, the VAS (102) routes communications and messages to the subscriber and also notifies the subscriber of incoming communications. The single number, IP address (network address) and/or email address may also be used to access all messages for the subscriber.]

33 Claims, 11 Drawing Sheets

SYSTEM AND METHOD FOR PROVIDING UNIFIED COMMUNICATION SERVICES SUPPORT

BACKGROUND

1. Technical Field

The present invention relates generally to communication systems; and more particularly to multimedia communications, e.g., voice, data and video communications and the manner in which these communications are serviced across differing networks.

2. Related Art

Voice communications provided by the Public Switched Telephone Network (PSTN) and wireless networks are well known. For many years, the PSTN and wireless networks have voice communications worldwide. The PSTN has become so pervasive that most persons and businesses depend upon the services it provides as a part of their daily lives. In much the same way as the PSTN has achieved an almost complete penetration of the consumer and business markets, cellular wireless networks are growing at breakneck speeds. Many customers are now dependent upon their cellular telephones to support most, if not all, of their voice communication requirements, displacing in part the services previously provided by the PSTN.

The PSTN and the wireless networks support other services besides voice communications. Examples of these services include voice mail, conference calling and call forwarding, among other teleservices. As a general rule, different PSTN service providers provide differing sets of teleservices. Further, within a particular service provider's service area, some teleservices may not be available across all portions of the service area. Many teleservices require expensive central office equipment that is not justified in lightly populated portions of the service area. Thus, a user may not be able to receive all desired teleservices when traveling.

The Internet has also recently been used in the routing of voice communications. Internet telephony (IP telephony) may be established using specialized IP telephony equipment that connects directly to the Internet or to the Internet via another packet-switched. network. Alternatively, an IP telephony call may be established using IP telephony gateways, each of which couples to the Internet and couples to a respective party via the PSTN. Thus, IP telephony is employed to provide a full or partial routing of calls across the Internet.

Electronic mail (email) has become a staple communication tool over the last decade. With the popularity and availability of personal computers and the Internet, email will soon surpass conventional mail in volume. Currently, the Internet routes a substantial portion of email traffic. However, private networks, and other publicly accessible networks also carry email. Using email requires a terminal device such as a personal computer and, in addition, requires access to a data network that supports the email. Access may be via a direct connection to a mail server coupled to the Internet, to a mail server via an Internet, to a mail server via the PSTN, or via some other communication path. With one of these communication paths established, a mail program resident on a terminal device allows a user to send and receive email.

Video telephony, video teleconferencing and video image streaming are rapidly becoming available. Video teleconferencing, for example, has achieved modest popularity over the past few years, limited mostly by the unavailability and expense of high bandwidth connections between terminal equipment. Video telephony, however, is currently not generally supported although it will likely become feasible with the establishment of high bandwidth IP networks. Video image transfer over the Internet is now quite popular. However, real-time video image transfer is limited by the available bandwidth between terminal devices that may be obtained across the Internet.

Facsimile (Fax) communications have been employed for many years and now are also a staple communication service. Facsimile machines typically communicate over the PSTN. Further, many personal computers having modems also support the transmission and receipt of Faxes. In some instances, the Internet has been employed to provide partial routing of Faxes to reduce routing costs.

All of these types of services may be referred to generally as communication services. While many users would like to have all of these communication services at his or her disposal, significant hurdles currently exist in establishing, maintaining and using these communication services. Differing service providers are required for accessing and using the communication services. For example, most voice services are provided by a telephone company while most email services are provided by Internet service providers. Further, multimedia services typically require the establishment of a high bandwidth service, such service available from many different service providers on a number of different platforms, each of which is difficult to setup and maintain. Generally speaking, most consumers can setup and use voice services, some consumers can obtain and use email services and very few consumers can obtain and use multimedia services.

Another difficulty relating to obtaining and using these communication services relates to the differing terminal equipment and connections required. The PSTN services at least a portion of most voice communications. However, wireless networks and the Internet also service many voice communications. Each of these types of services requires different terminal equipment. The Internet services most email communications. However, sending and receiving email also requires a particular terminal device. Fax transmission and receipt requires another type of terminal equipment. Multimedia services may require still another type of terminal equipment. Moreover, the differing types of services also require differing types of network interfaces. Phones typically require a PSTN connection. However, an Internet connection may require a PSTN, ISDN, DSL, cable modem or other connection. As will be appreciated, providing compatible network connections for each of these services adds additional complexity.

Thus, currently, a single user desiring to use all of these communication services must maintain multiple terminal devices and multiple network connections. Typically, a consumer will have a telephone, a personal computer and, if the consumer desires to receive video communication services, the user will have a specialized video communication device. Further, the user must obtain these services from a plurality of service providers, thus increasing the complexity and cost of obtaining the services.

Thus, there is a need in the art for a system and method that provides communication services without the complexities and difficulties described above.

SUMMARY OF THE INVENTION

Thus, to overcome the shortcomings of the prior systems, among other shortcomings, a virtual assistant system (VAS)

constructed according to the present invention supports communication services that were previously only available via differing communication networks and from differing service providers. In providing these communication services, the VAS interfaces to both a telephone network and to a data network. The telephone network may be the PSTN and/or another telephone network. The data network may be the Internet, an Intranet or another data network in which communications are packet based.

The VAS supports/provides call services, message services and profile services. The call services include call receipt services, call initiation services, conference calling services and other types of services in which calls are initiated, routed and/or completed and that are typically provided by a telephone company. The message services include voice mail, email, Faxes, video mail, and other types of messages that include one or more types of media, e.g., audio or visual. The profile services uniquely identify each subscriber and provide contact information for the subscriber.

A user's profile includes personal information for a corresponding subscriber, such personal information including the subscriber's name, the subscriber's address, and all pertinent contact information for the subscriber, e.g., home phone number(s), work phone number(s), mobile phone number(s), email address(es), IP address(es), pager number(s) and other information that may be employed to contact the subscriber. The profile also includes a plurality of reach lists for the subscriber, each reach list including a set of contact numbers/addresses for the subscriber. Corresponding to each reach list is a schedule that indicates when the reach list is active.

All communications for the subscriber are received via a single telephone number, IP address (network address) and/or email address. Based upon the content of the reach lists and corresponding schedules, the VAS routes communications and messages to the subscriber and also notifies the subscriber of incoming communications. The VAS also gives the subscriber the option of screening incoming calls. The incoming caller is announced to the subscriber and the subscriber has the option of accepting or rejecting the call. The single number, IP address (network address) and/or email address may also be used to access all messages for the subscriber. When the subscriber accesses messages in his or her mailbox, he or she can perform the following: (1) listen to/send emails; (2) listen to voice mails; (3) forward faxes to a fax machine; (4) reply to emails/voice mails; and (5) delete emails/voice mails/faxes. Thus, the VAS provides single-number access for the subscriber, independent of the subscriber's physical location or communication contact path.

The VAS may be embodied on a single computer server or upon multiple computer servers. In one embodiment, a plurality of computer servers couples to a communication services packet switched network (CSPSN), each of the computer services providing a particular communication service or network function. In this embodiment, VAS software instructions are resident upon at least one of the computer servers. This embodiment provides flexibility, scalability and simplicity in implementation of the VAS.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
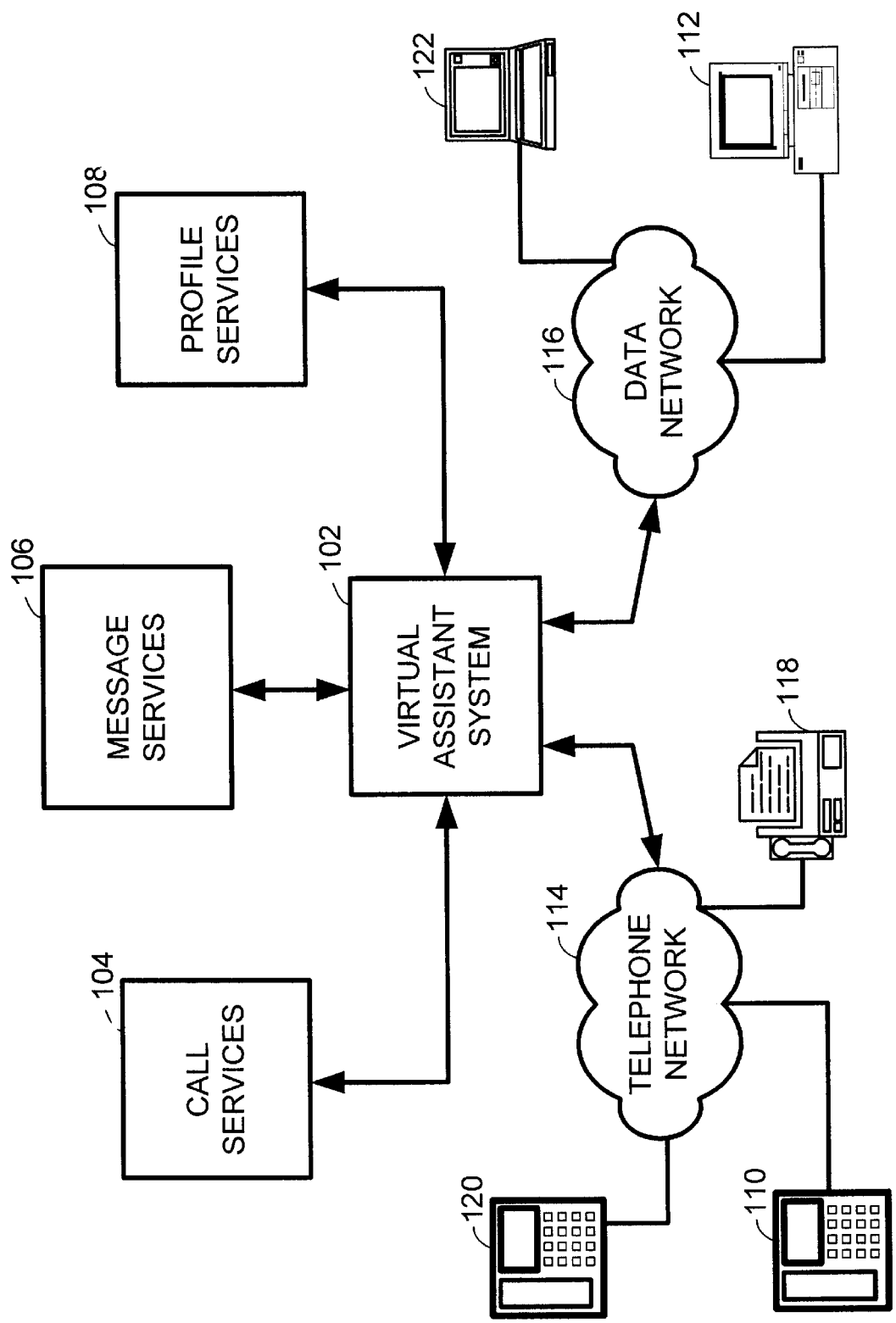
FIG. 1 is a system diagram illustrating a virtual assistant system constructed according to the present invention and how it interfaces with a telephone network, a data network, call services, message. services and profile services.

FIG. 1 is a system diagram illustrating a virtual assistant system (VAS) 102 constructed according to the present invention and how it interfaces with a telephone network 114, a data network 116, call services 104, message services 106 and profile services 108. In the embodiment illustrated, the telephone network 114 represents the Public Switched Telephone Network (PSTN) or another telephone-like network or networks. The telephone network may be circuit switched, e.g., PCM, or may be packet switched. The data network 116, on the other hand, is a packet switched network that may comprise the Internet, one or more Intranets, Local Area Networks (LANs), Wide Area Networks (WANs), and/or other data networks.

The call services 104 include call receipt services, call initiation services, conference calling services and other types of services in which calls are initiated, routed and/or completed and that are typically provided by a telephone network service company. The message services 106 include voice mail, email, Faxes, video mail, and other types of messages that include one or more types of media, e.g., audio or visual. The profile services 108 uniquely identify each subscriber and provide contact information for the subscriber.

A user's profile includes personal information for a corresponding subscriber, such personal information including the subscriber's name, the subscriber's address, and all pertinent contact information for the subscriber, e.g., home phone number(s), work phone number(s), mobile phone number(s), email address(es), IP address(es), pager number(s) and other information that may be employed to contact the subscriber. The profile also includes a plurality of reach lists for the subscriber, each reach list including a set of contact numbers/addresses for the subscriber. Corresponding to each reach list is a schedule that indicates when the reach list is active.

All communications for the subscriber are received via a single telephone number, IP address (network address) and/or email address. Based upon the content of the reach lists and corresponding schedules, the VAS routes communications and messages to the subscriber and also notifies the subscriber of incoming communications. The single number, IP address (network address) and/or email address may also be used to access all messages for the subscriber. Thus, the VAS provides single-number access for the subscriber, independent of the subscriber's physical location or communication contact path.

In one example of operation according to the present invention, caller X using telephone 120 places a call to subscriber A, using subscriber A's VAS telephone number. The telephone network 114 routes the call from telephone 120 to the VAS 102. The VAS 102 receives the call and accesses an active reach list for subscriber A. Based upon the content of the reach list, the VAS 102 determines that subscriber A may be contacted at telephone 110. Thus, the VAS 102 initiates a call to subscriber A at telephone 110. If subscriber A answers, the VAS 102 announces the caller with a recording of the caller's name (which is collected when the caller calls the subscriber) and asks subscriber A whether he or she desires to receive the call. If subscriber A elects to receive the call, the VAS 102 establishes a voice path between the caller at telephone 120 and subscriber A at telephone 110. In one operation, the call is routed through the VAS 102 and this routing is retained until the call is completed. However, in another operation, the VAS 102 completes the call via the telephone network 114 and then releases the call to the telephone network 114, which then optimally routes the call.

If subscriber A is unavailable, or elects not to receive the call, the VAS 102 routes the call to a voice mail service of the message services 106 so that the caller may leave a message. If a message is left, the VAS 102 may then send a notification to subscriber A in the form of a page, email message, or other notification communication. However, alternatively, no notification is provided.

In another operation according to the present invention, caller Y using telephone 120 places a call to subscriber B, using subscriber B's VAS telephone number. The telephone network 114 routes the call from telephone 120 to the VAS 102. The VAS 102 receives the call and accesses an active reach list for subscriber B. Based upon the contents of the reach list, the VAS 102 determines that subscriber B may be contacted at computer 112. Thus, the VAS 102 initiates an IP telephony call to subscriber B at computer 112. If subscriber B answers, the VAS 102 announces the caller with a recording of the caller's name and asks subscriber B whether he or she desires to receive the call. If subscriber B elects to receive the call, the VAS 102 completes a voice path between the caller and subscriber B. Because the call is an IP telephony call, the VAS 102 routes the call from the telephone 120 to the computer 112. In one operation, the call is routed through the VAS 102 and this routing is retained until the call is completed. However, in another operation, the VAS 102 routes the call via an IP telephony gateway (not shown) coupled between the telephone network 114 and the data network 116. Further, if subscriber B is unavailable, or if subscriber B elects not to receive the call, the VAS 102 routes the call to a voice mail service of the message services 106 that is supported by the VAS 102.

In still another operation of the VAS 102, user Z of computer 122 sends an email to subscriber C at subscriber C's email address. The data network 116 routes the email to the VAS 102, the VAS 102 receives the email, stores the email for subscriber C and may notify subscriber C regarding the email. In a similar operation, a user of Fax machine 118 sends a Fax to subscriber D using his or her single contact telephone number. The VAS 102 receives the corresponding call, determines that it is a Fax intended for subscriber C, receives the Fax and stores it for subscriber C. Based upon subscriber C's profile, the VAS 102 may notify subscriber C of the receipt of the Fax along with an identity of the sending party.

Other operations supported by the VAS 102, which will be discussed in more detail with reference to FIGS. 5A, 5B, 6A, 6B, 7A and 7B include call initiation, call receipt, conference call servicing, message center access, profile creation and modification, address book operations, Fax-Back services and other operations. These services may be accessed via both the telephone network 114 and the data network 116. Thus, the VAS 102 provides a network independent interface for these services.

Figure 2:
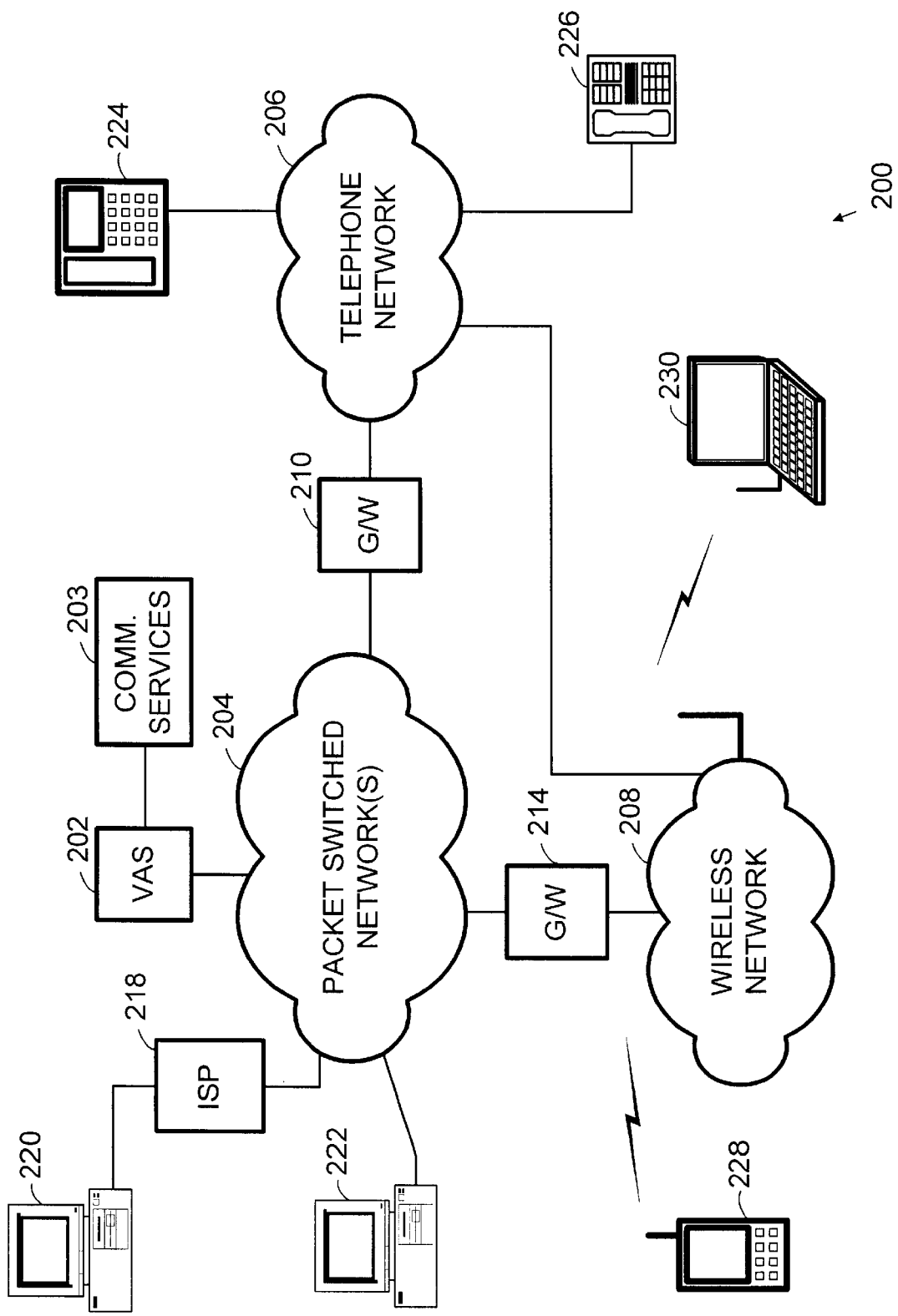
FIG. 2 is a system diagram illustrating a virtual assistant system embodied as a virtual assistant system server that is constructed according to the present invention and that is interfaced to a plurality of communication networks.

FIG. 2 is a system diagram illustrating a virtual assistant system server 200 constructed according to the present invention and the manner in which it interfaces to a plurality of communication networks. The VAS server 202 couples to at least one packet switched network 204, which may be the Internet, an Intranet or the combination of the Internet with one or more Intranets. The VAS server 202 also couples to at least one communication services device 203. Thus, the VAS server 202 converses with all other devices using one or more packet switched protocols supported by the packet switched network 204. In the embodiment, the VAS sever 202 may include a plurality of computer servers and the communication services device 203 may also include a plurality of computer servers.

A telephone network 206 (which may be the public switched telephone network "PSTN") or another telephone network couples to the packet switched network(s) 204 via a gateway 210. Further, wireless network 208 couples to the packet. switched network(s) 204 via a gateway 214. The wireless network 208 also couples to the telephone network 206. The manner in which the packet switched network(s) 204 couples to the telephone network 206 and to the wireless network 210 is generally known. Further, the manner in which the wireless network 208 couples to the telephone network 206 is also generally known. Thus, the interaction between the packet switched network(s) 204 and the other networks 206 and 210 will be described only as it relates to the present invention. And, of course, the structure illustrated in FIG. 2 is an example only of one embodiment. Other structures may be constructed that also operate according to the present invention.

Computers 220 and 222 couple to the packet switched network(s) 204 so that they may send and receive packet data. While computer 222 has a direct connection to the packet switched network 204, computer 220 accesses the packet switched network via an Internet Service Provider (ISP) 218. Many users currently access the Internet (one embodiment of a packet switched network) via an ISP 218, as illustrated with the connection for computer 220. However, some computers currently access the Internet via an Intranet or other coupling network, or simply have a direct Internet connection. In these constructions, an ISP is not required, as illustrated with computer 222. Thus, simply stated, the structure illustrated in FIG. 2 provides a platform of operation for the present invention but should not be construed to limit the teachings of the present invention.

Telephones 224 and 226 couple to the telephone network 206. While telephone 224 is a multimedia phone, servicing audio and video communications, telephone 226 is simply an audio phone, servicing only audio communications. Thus, telephone 224 includes a video display as well as a handset. The telephone network 206, as was previously described, may be the PSTN, which transmits data in a PCM format. In another embodiment, the telephone network 206 may be a packet. switched telephone network that operates in a packet-switched manner. The teachings of the present invention, therefore, apply equally well to current and future telephone network technology.

Wireless devices 228 and 230 wirelessly connect to the wireless network 208. The wireless network 208 may be cellular based, satellite based or otherwise constructed to provide wireless communication services within a respective service area. Wireless device 230 is a portable computer that services communications over a wireless link to the wireless network 208. Wireless device 228 is a personal data assistant that also wirelessly communicates with the wireless network 208. The wireless network 208 interfaces with the packet switched network(s) 204 via the gateway 214 and interfaces directly with the telephone network 206.

According to the present invention, any of the terminal devices 220, 222, 224, 226, 228 or 230 may interact with the VAS 202 via a respective set of network connections. Via these network connections, the users of these devices may obtain the services described previously with reference to FIG. 1 and which will be described subsequently with reference to FIGS. 5A, 5B, 6A, 6B, 7A and 7B.

Figure 3:
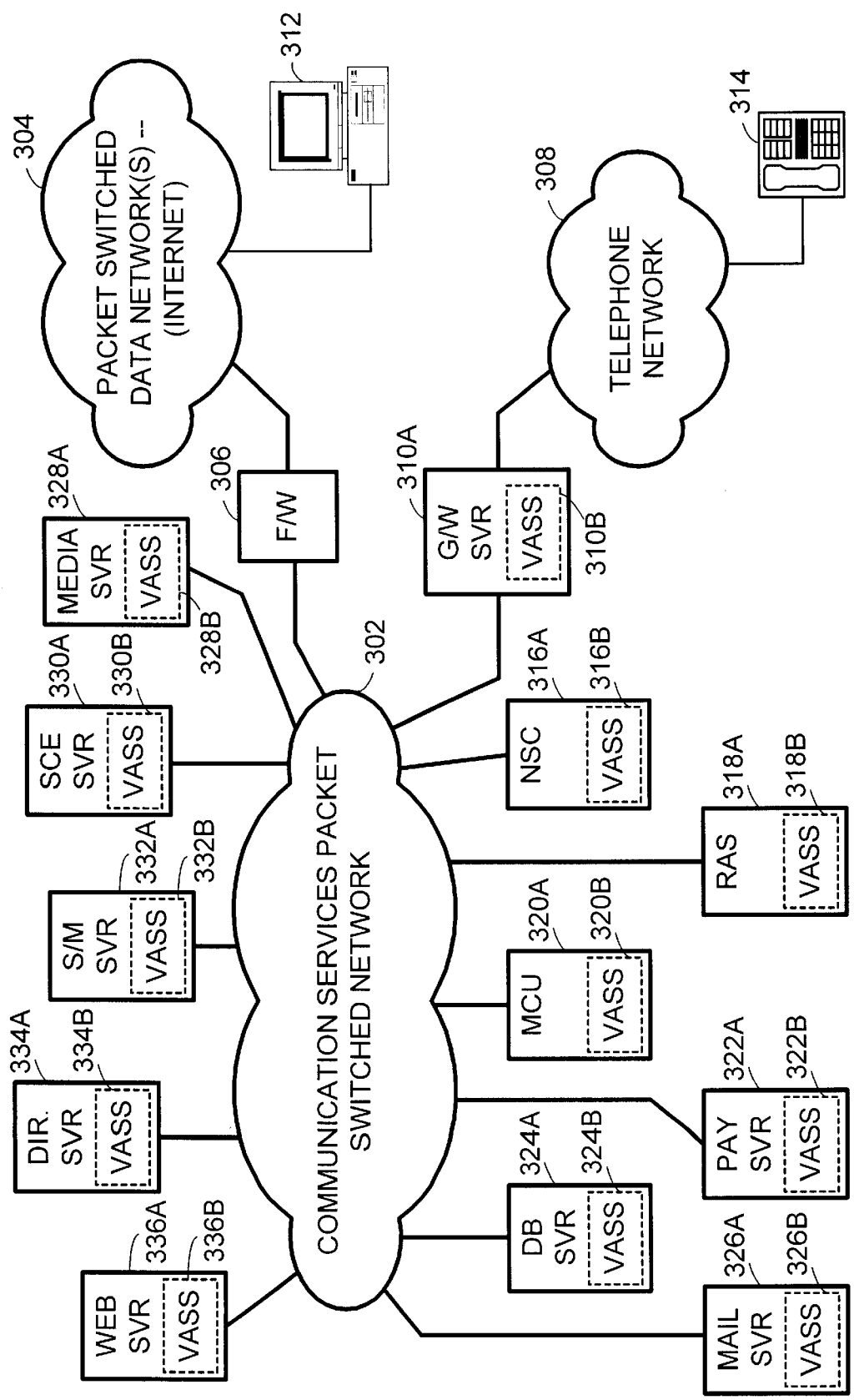
FIG. 3 is a system diagram illustrating another embodiment of a virtual assistant system constructed according to the present invention and its interface to a plurality of communication networks.

FIG. 3 is a system diagram illustrating another embodiment of a virtual assistant system constructed according to the present invention and its interface to a plurality of communication networks. FIG. 3 also illustrates how the VAS may be distributed among a number of computer servers, each of which performs a particular set of VAS functions. In the structure of FIG. 3, a communication services packet switched network (CSPSN) 302 serves to intercouple a plurality of computer servers, each of which performs a particular set of functions. As is shown, the CSPSN 302 couples to a data network 304, e.g., the Internet, via a firewall 306 and couples to a telephone network 308 via a gateway server 310A. With these connections, the VAS may provide services to computer 312 and to telephone 314 via respective communication paths and using respective communication protocols. While each of the computer servers supports the Internet Protocol (IP) in the illustrated embodiment, each of the computer servers also supports additional protocols that are required to provide the particular supported services.

A network services controller (NSC) 316A generally controls the operation of the other computer servers coupled to the CSPSN 302. The NSC 316A, provides call control, proxy server capabilities, signaling (for each of the protocols required to operate the CSPSN 302), resource management functions and provides service execution for client side services. Because of the many varied functions provided by the NSC 316A, the NSC 316A supports a plurality of communication protocols, each of which is employed to communicate with one or more of the other computer servers coupled to the CSPSN 302. For IP call control, the NSC 316A supports the SIP, SIP+, ITAG+, H.323 and UNISTM protocols. For directory operations, the NSC 316A supports the LDAP protocol. For database operations, the NSC 316A supports the ESQL protocol and for web page operations, the NSC 316A supports the HTTP protocol.

Finally, for media server applications, the NSC 316A supports the MGCP+ protocol and for network management operations, the NSC 316A supports the SNMP protocol. Other protocols supported by the NSC 316A for other purposes include the FTP, TAP, CGI, JAVA, XML, RADIUS, IMAP4 and POP3 protcols, among others.

The resource allocator server (RAS) 318A allocates services provided by the VAS as well as the other services supported by the computer servers. The Multi-point Conferencing Unit (MCU) server 320A services video conferencing applications. In providing this service, the MCU server 320A supports the SNMP protocol as well as at least one video conferencing protocol. The payment server 322A tracks the cost of services consumed by the subscribers as well as the payments made by the subscribers. The payment server 322A supports the SNMP and RADIUS protocols. The database server 324A provides a data repository for the subscriber, network, service and system information required to operate the CSPSN 302 and the services provided thereby. In providing this service, the database server 324A supports the ESQL, LDAP, ODBC and SNMP protocols.

The mail server 324A provides common storage for the various message types supported by the VAS, such message types including email, Faxes, Video mail and voice mail. The mail server 324A may comprise a single server or multiple servers. For mail retrieval operations, the mail server 324A supports the IMAP4 and POP3 protocols. For interacting with other mail servers, the mail server 324A supports the SMTP protocol. Finally, for network management operations, the mail server 324A supports the SNMP protocol.

The gateway server 310A and the media server 328A together service voice communications via both the packet switched data network 304 and the telephone network 308. The gateway server 310A provides a gateway between the IP space (data network 304 and CSPSN 302) and the TDM space (the telephone network 308). The gateway server 310A and/or the media server 328A also provide Interactive Voice Response (IVR) functions. These IVR functions include playing announcements to subscribers and non-subscribers and collecting digits as responses. The gateway server 310A supports the SIP, SIP+, ITAG, H. 323 and RTP protocols to the IP space and the PRI protocol to the TDM space. Thus, the gateway server 310A provides a signaling interface to the telephone network 308, such signaling interface consistent with common channel signaling protocol standards, e.g., CCS-7 signaling in one embodiment. The media server 328A supports the SAPI protocol for text to speech conversion and the SNMP protocol for network management operations. In communicating with the NSC 316A, the media server 328A also supports the MGCP+ protocol. In its operations, the media server 328A also provides speech recognition functions, text to speech conversions, Fax:functions and audio conferencing functions.

The service control environment (SCE) server 330A allows the service provider to establish and manage one or more particular services. The system manager server 332A manages all of the servers as a logical system. It manages services from anywhere in the CSPSN 302 and provides web-based access to all OAM&P functions. Examples of the functions performed by the system manager server 332A include, but are not limited to, server management, state management, log and alarm management, performance management, software management, data base management and system access and integrity management. The system manager server 332A communicates with all other servers using the SNMP protocol.

The directory server 334A provides a data repository for user, network, security, service, and policy information. The directory server 334A also provides replication, distribution and other types of directory operations. In communicating with the NSC 316A and the Internet, the directory server 334A supports the LDAP and ESQL protocols. Further, the directory server supports the SNMP in network management operations. The web server 336A provides access to the service web pages on common web browsers such as Netscape and Internet Explorer. The web server 336A also provides authentication functions, provisioning functions and operations relating to system operating parameters. In its directory operations, the web server 336A supports the FTP, HTTP, CGI, JAVA and XML protocols. In its database operations, the web server 336A supports the ODBC protocol. Finally, the web server 336A also supports the SNMP protocol in its network management operations.

In the embodiment of FIG. 3, the VAS is constructed as a set of software instructions, the VAS software (VASS). The VASS instructions are loaded onto at least one of the server computers and executed to accomplish the operations of the VAS. In the illustrated embodiment, VASS 310B resides on the gateway server 310A, VASS 316B resides on the NSC 316A, VASS 318B resides on the resource allocator server 318A, VASS 320B resides on the MCU 320A, VASS 322B resides on the payment server 322A, VASS 324B resides on the database server 324A and VASS 326B resides on the mail server 326A. Moreover, VASS 328B resides on the media server 328A, VASS 330B resides on the service creation environment server 330A, VASS 332B resides on the system manager server 332A, VASS 334B resides on the directory server 334A and VASS 336B resides on the web server 336A. However, in other embodiments, the VASS resides on only a portion of these servers. Thus, in the illustrated embodiment, the VAS is implemented as a distributed software solution, this solution exhibiting the advantages of scalability, expandability and flexibility.

Figure 4A:
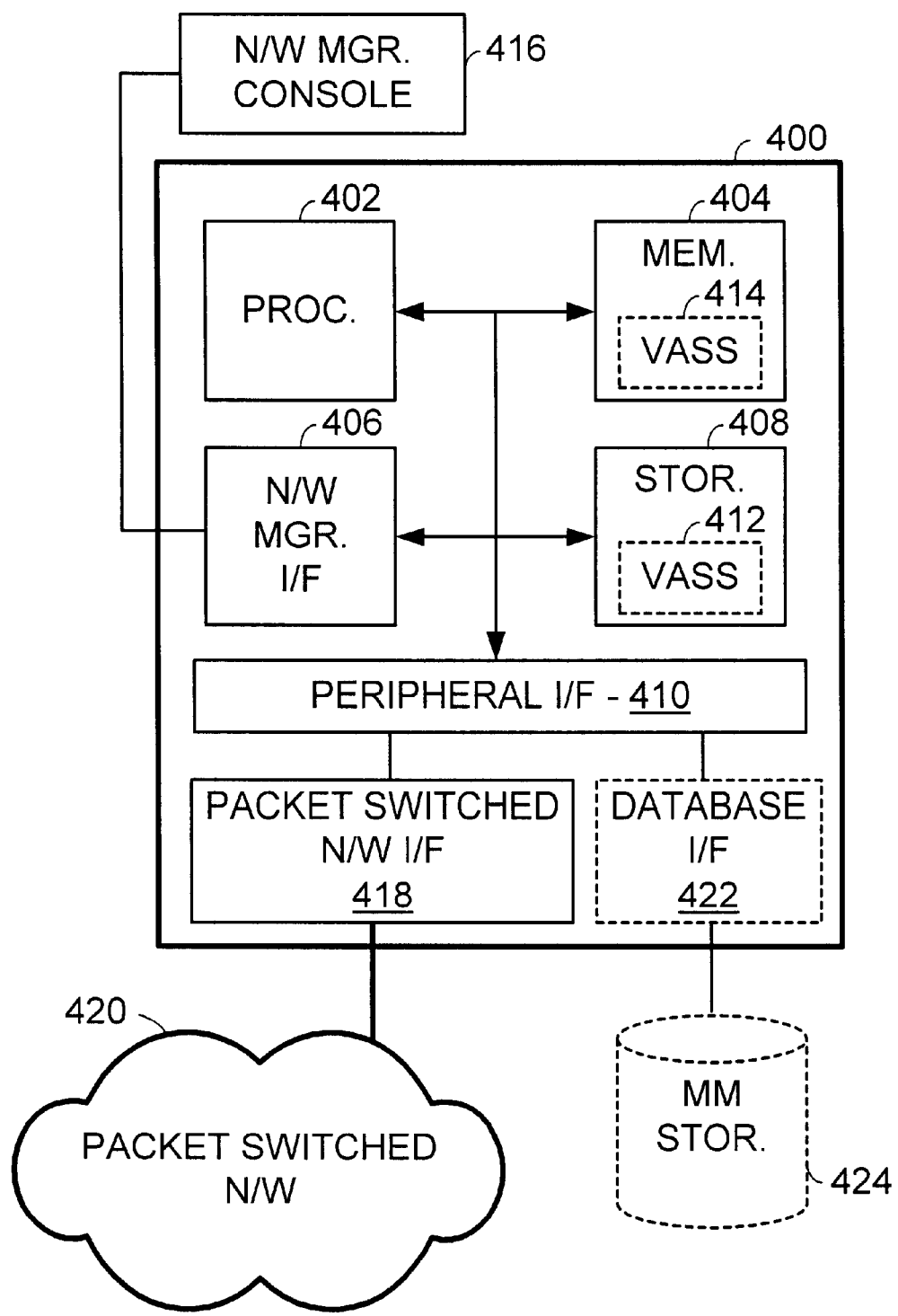
FIG. 4A is a block diagram illustrating a virtual assistant system server constructed according to the present invention that provides at least a portion of the functions of the virtual assistant system.

FIG. 4A is a block diagram illustrating a VAS server 400 constructed according to the present invention that provides at least a portion of the functions of the virtual assistant system. The VAS server 400 may be general-purpose computer that has been programmed and/or otherwise modified to perform the particular operations described herein. However, the VAS server 400 may be specially constructed to perform the operations described herein. In particular, the VAS server 400 may be any of the computer servers shown in FIG. 3 that executes some, or all of the VASS instructions.

The VAS server 400 includes a processor 402, memory 404, a network manager interface 406, storage 408 and a peripheral interface 410, all of which couple via a processor bus. The processor 402 may be a microprocessor or another type of processor that executes software instructions to accomplish programmed functions. The memory 404 may include DRAM, SRAM, ROM, PROM, EPROM, EEPROM or another type of memory in which digital information may be stored. The storage 408 may be magnetic disk storage, magnetic tape storage, optical storage, or any other type of device, which is capable of storing digital instructions and data.

The network manager interface 406 couples to a network manager console 416, which allows a network manager to interface with the VAS server 400. The network manager console 416 may be a keypad/display or may be a more complex device, such as a personal computer, which allows the manager to interface with the VAS server 400. However, the network manager may interface with the VAS server 400 using other techniques as well, e.g., via a card coupled to the peripheral interface 410.

The peripheral interface 410 couples to a packet switched network interface 418 and a database interface 422. The packet switched network interface 418 couples the VAS server 400 to a packet switched network 420, e.g., the CSPSN 302 of FIG. 3, the Internet or another packet switched network. The database interface 422 couples the VAS server 400 to a multimedia storage device 424. The multimedia storage device 424 may store messages, profiles and other data that is employed to service the VAS. The multimedia storage device may be configured so that it is accessible by multiple VAS servers.

VASS instructions 412 are loaded into the storage 408 of the VAS server 400. Upon their execution, a portion of the VASS 412 are downloaded into memory 404 (as VASS 414). The processor 402 then executes the VASS 414 instructions to perform the operations described herein. The programming and operation of digital computers is generally known to perform such steps. Thus, only the functions performed by the VAS server 400 will be described and not the manner in which the processor 402 and the other components of the VAS server 400 function to perform these operations.

Figure 4B:
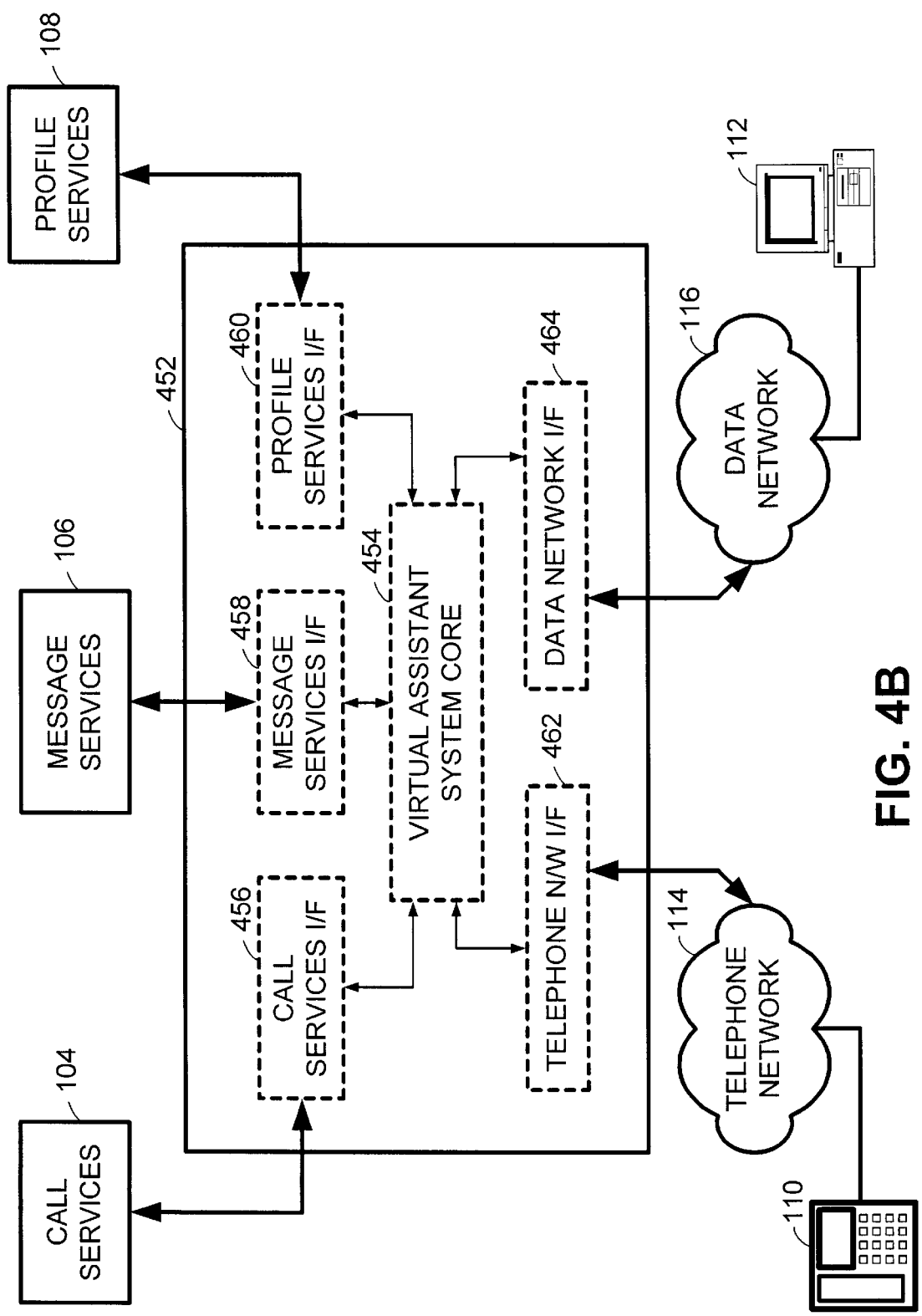
FIG. 4B is a functional block diagram illustrating the functional components of a virtual assistant system constructed according to the present invention.

FIG. 4B is a functional block diagram illustrating the functional components of a virtual assistant system 452 constructed according to the present invention. As was described with reference to FIG. 3, the components of the VAS 452 may be contained upon a single computer or distributed upon multiple computers. Thus, a review of FIG. 4B must be made with this concept in mind.

The VAS 452 includes a VAS core 454 that performs the core functions of the VAS 452. The VAS 452 also includes a telephone network I/F 462 which interfaces the VAS core 454 to a telephone network 114 and allows the VAS 452 to interface with a telephone 110 coupled to the telephone network 114. The VAS 452 also includes a data network I/F 464 which interfaces the VAS core 452 to a data network 116 and that allows the VAS 452 to interface with a computer 112 coupled to the data network 116.

The VAS 452 also includes a call services I/F 456 which interfaces the VAS core 454 to call services 104. A message services I/F 458 interfaces the VAS core 454 to message services 106. Further, a profile services I/F 460 interfaces the VAS core 454 to profile services 108.

Figure 5A:
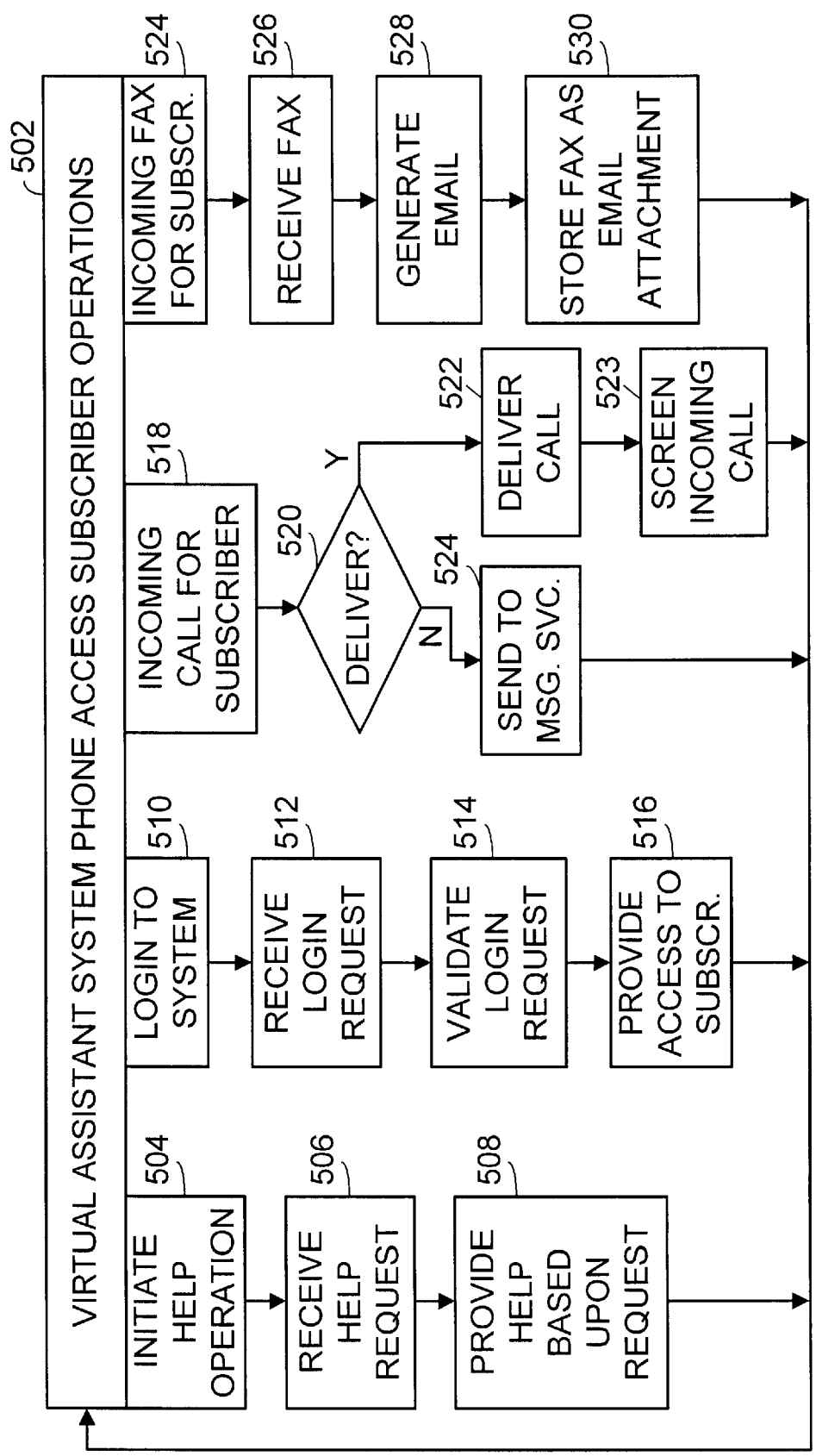
FIGS. 5A and 5B are logic diagrams illustrating operations of the virtual assistant system that are provided to a subscriber via a telephone network.
Figure 5B:
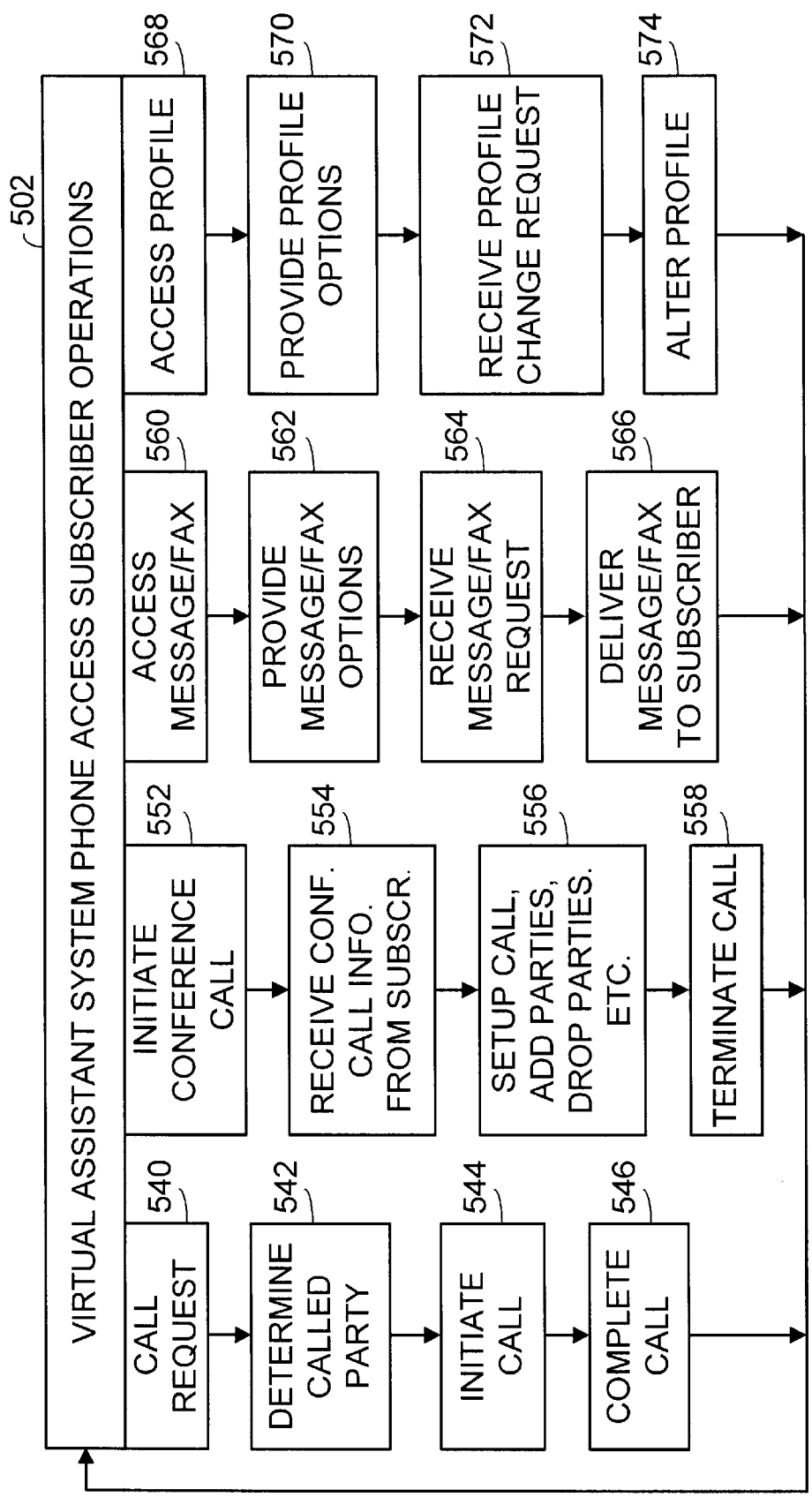

FIGS. 5A and 5B are logic diagrams illustrating operations of the virtual assistant system that are provided to a subscriber via a telephone network. A subscriber to the VAS may access the system by a single (or multiple) line phone, a cellular phone or an IP based phone (e.g., H.323 phone, SIP phone, etc.). Generally speaking, the subscriber may place and receive calls, retrieve, reply and forward messages, establish, maintain and terminate conference calls, review account balances, transactions and charges and perform a limited update of the subscriber's profile. Each of these services is provided to the subscriber via his or her VAS telephone number.

Referring specifically to FIG. 5A, a user may initiate help operations (step 504). These help operations may be accessed by calling the VAS and following the instructions provided by the VAS. The menus provided are available to both subscribers and non-subscribers. However, non-subscribers are offered limited help menus. Based upon a help request received from the subscriber in response to a menu offering (step 506), the VAS provides help to the subscriber (step 508). As an example of a help operation, the subscriber requests a particular category of help information. In response, the VAS provides helpful information. Alternately, the VAS may offer to send the subscriber to an attendant via keypad operation or a voice recognition system operation.

In receiving services provided by the VAS, the subscriber may be required to login to the system (step 510).

In such case, the VAS requests that the subscriber enter his or her password in response to a login request (step 512). Upon receipt of the password, the VAS then validates the login request (step 514). If the password is valid, the VAS provides subscriber access privileges to the subscriber (step 516).

The VAS also manages incoming calls for the subscriber and, in typical operations, receives all incoming calls for the subscriber, routes calls to the subscriber when appropriate and routes calls to a message service when appropriate. The VAS provides find me/follow me operations so that the subscriber may receive his/her calls, regardless of where he or she may be located when the call is received. When the call is initially incoming (step 518), the VAS locates the subscriber. In locating the subscriber, the VAS accesses the subscriber's profile, investigating the subscriber's reach list. The reach list includes at least one entry that indicates where the subscriber may be located. This location may be accessed via the telephone network, via the Internet, via a wireless network or via another communication path. The VAS then determines whether to deliver the call (step 520). In determining whether to deliver the call, the VAS may query the user. In one example of operation, the VAS calls the subscriber and provides the subscriber with information regarding the call, e.g., calling party identification, call type, calling entity, etc., and asks the subscriber whether he or she desires to receive the call. The subscriber responds, for example with a "1" to accept the call and with a "2" to reject the call. If the subscriber opts to receive the call, the call is delivered (step 522). The subscriber then has the opportunity to screen the call (step 523). If delivery is rejected, the call is sent to a message service (step 524).

The VAS also receives Faxes for the subscriber, stores the Faxes and delivers the Faxes when requested. When the VAS receives a Fax intended for the subscriber (step 524), the VAS receives the Fax (step 526). The VAS then generates an email regarding the Fax (step 528), attaches the Fax to the email and stores the Fax with the email as an email attachment. In one embodiment, the Fax is placed into a ".tif" file and attached to the email as a file. The VAS may also notify the subscriber of the incoming Fax.

Referring now to FIG. 5B, the VAS also serves to place calls for the subscriber. When the VAS receives a call request (step 540), it initiates a corresponding call. Upon initiation, the VAS determines the called party to which the subscriber desires to connect (step 542). The VAS supports voice activated dialing in which the subscriber speaks the name of the called party and the VAS searches the subscriber's address book for a match. If a match occurs, the VAS selects the called party. The VAS may also provide a verification request to the subscriber to determine whether the entered selection is correct. In determining the party to which a connection will be made, the VAS may also allow the subscriber to enter a number from the subscriber's keypad. When the called party has been determined, the VAS initiates the call (step 544) and, if the attempt is successful, completes the call (step 546). The call completion may be accomplished via the telephone network, the Internet or a combination of both, depending upon the subscriber's location, the called party's location, capabilities of the parties and profiles of the parties.

The VAS also serves to setup, complete and service conference calls. In one embodiment of the VAS, the VAS supports both on-demand audio conference calls and scheduled video conference calls. The VAS supports up to 32 parties in the described embodiment. Further, the VAS allows the subscriber to add and remove parties at any time and also to terminate the conference call at any time. Referring now particularly to FIG. 5B, when the subscriber initiates the conference call (step 552), the VAS receives conference call information from the subscriber (step 554). This information includes contact information for parties who initially will be included in the conference call, whether the conference call should be setup immediately and/or whether the conference call should be initiated at a particular time. In selecting parties, the subscriber may enter the contact information directly to the VAS or may select parties from a menu that is based upon contact information included in the subscriber's address book.

Based upon the information received from the subscriber, the VAS sets up the conference call with the initially included parties (step 556). Further, after the conference call is initiated, the VAS allows the subscriber to add parties, drop parties and performs other functions relating to the conference call. When the conference call is complete, based upon either the disconnection of all parties, or at the direction of the subscriber, the VAS terminates the conference call (step 558).

The VAS also allows a subscriber to access his or her messages/Faxes by phone. As was previously described, the VAS manages voice messages, Fax messages, email messages, multimedia messages and may manage additional types of messages that may.become available. Upon a message access by a subscriber (step 560), the VAS provides the subscriber with message/Fax options (step 562). These options provided to the subscriber allow the subscriber to (1) access all messages, independent of message type or sender; (2) access voice mail messages; (3) access email messages (4) access Fax messages; (5) access messages by name; and (6) access messages by category (e.g., urgent, private, etc.).

Based upon the option(s) for message delivery provided by the subscriber (step 564), the VAS notifies the subscriber of the corresponding messages that are present. When the subscriber accesses the VAS from a voice only phone, the VAS provides the subscriber with an audible description of the messages present. However, when the subscriber accesses the VAS from a multimedia telephone, the VAS may also provide the user with a visual listing of the messages that are present. Based upon the information provided, the subscriber selects one or more messages for delivery and the VAS delivers these messages to the subscriber (step 566).

The messages may be delivered to the device with which the subscriber accesses the VAS, e.g., voice telephone or multimedia telephone. Alternately, the subscriber may direct the VAS to deliver the messages to another device(s). This selection may be determined based upon the subscriber's profile or based upon an additional direction of the subscriber. For example, the subscriber may choose to receive voice mail at his or her telephone, may direct that emails be sent to his or her computer and may direct that Faxes be forwarded to a local Fax machine. In delivering Faxes however, the Faxes may simply be delivered as an email attachment instead of being delivered to a Fax machine.

All subscribers create and maintain a subscriber profile on the VAS. This subscriber profile is typically created when signing up for service but may be modified at any time thereafter. The profile contains all information used by the VAS in providing services to the subscriber. This information includes welcome greetings such as voice mail greetings and home page information among other types of greetings. Additional information contained in the profile includes contact information for call, Fax and message routing, address book information, find/me follow me preferences and additional information that has previously been described herein and that will be further described with reference to the figures. Profile information, of course, is not limited to the information described herein but may include additional information as well.

Still referring to FIG. 5B, after logging into the VAS, the user may access his or her profile (step 568). Upon such an access, the VAS provides profile options to the subscriber (step 570). Based upon the profile options provided, the subscriber may choose to alter his or her profile information. In such an operation, the VAS receives the altered profile information from the subscriber (step 572) and alters the profile accordingly (step 574). Examples of operations that may be performed via a phone access to alter the subscriber's profile include changing a welcome greeting, changing a voicemail greeting, changing a password, checking an account balance and reviewing transaction records, among other operations.

Figure 6A:
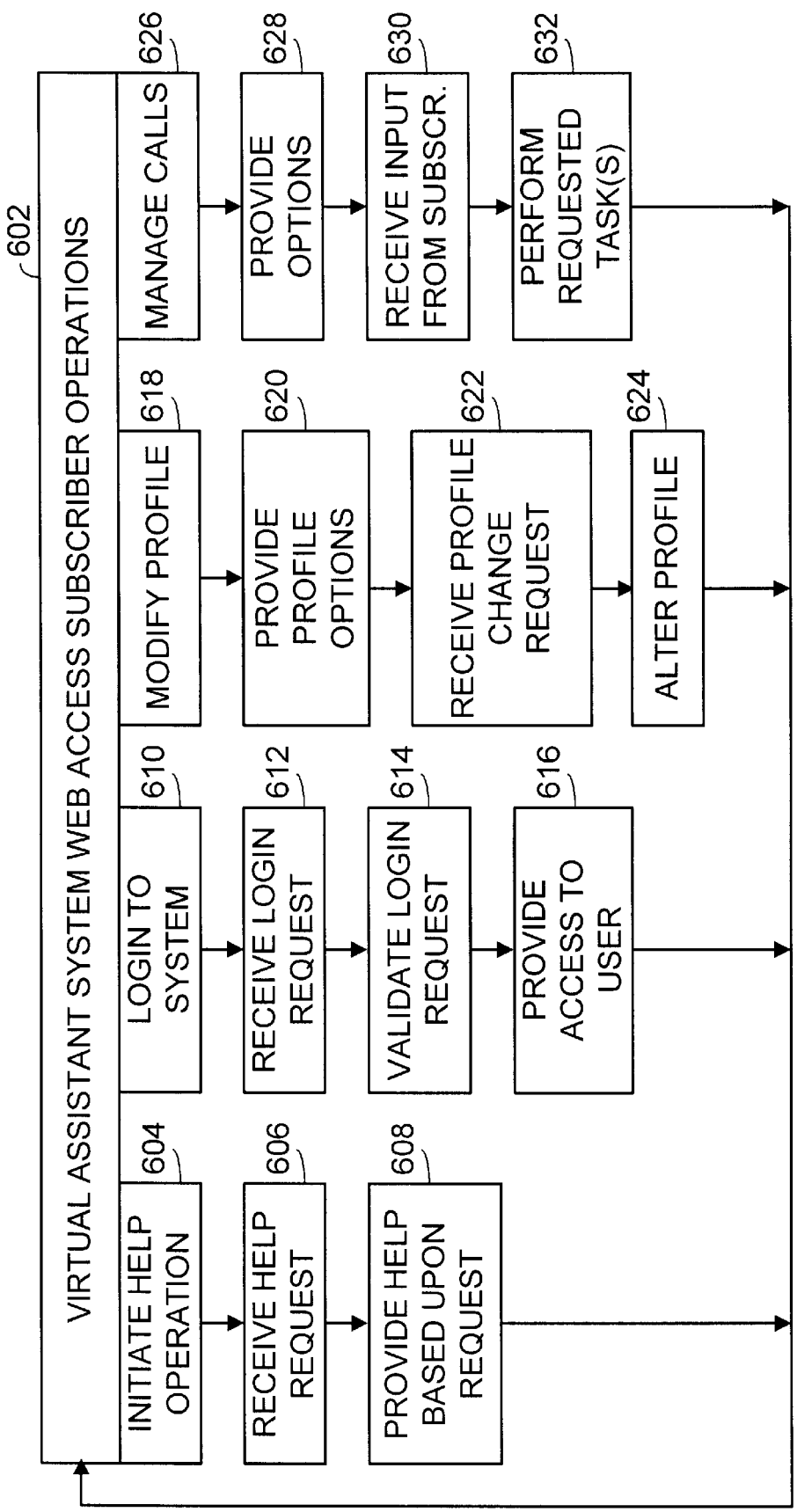
FIGS. 6A and 6B are logic diagrams illustrating operations of the virtual assistant system that are provided to a subscriber via a data network.
Figure 6B:
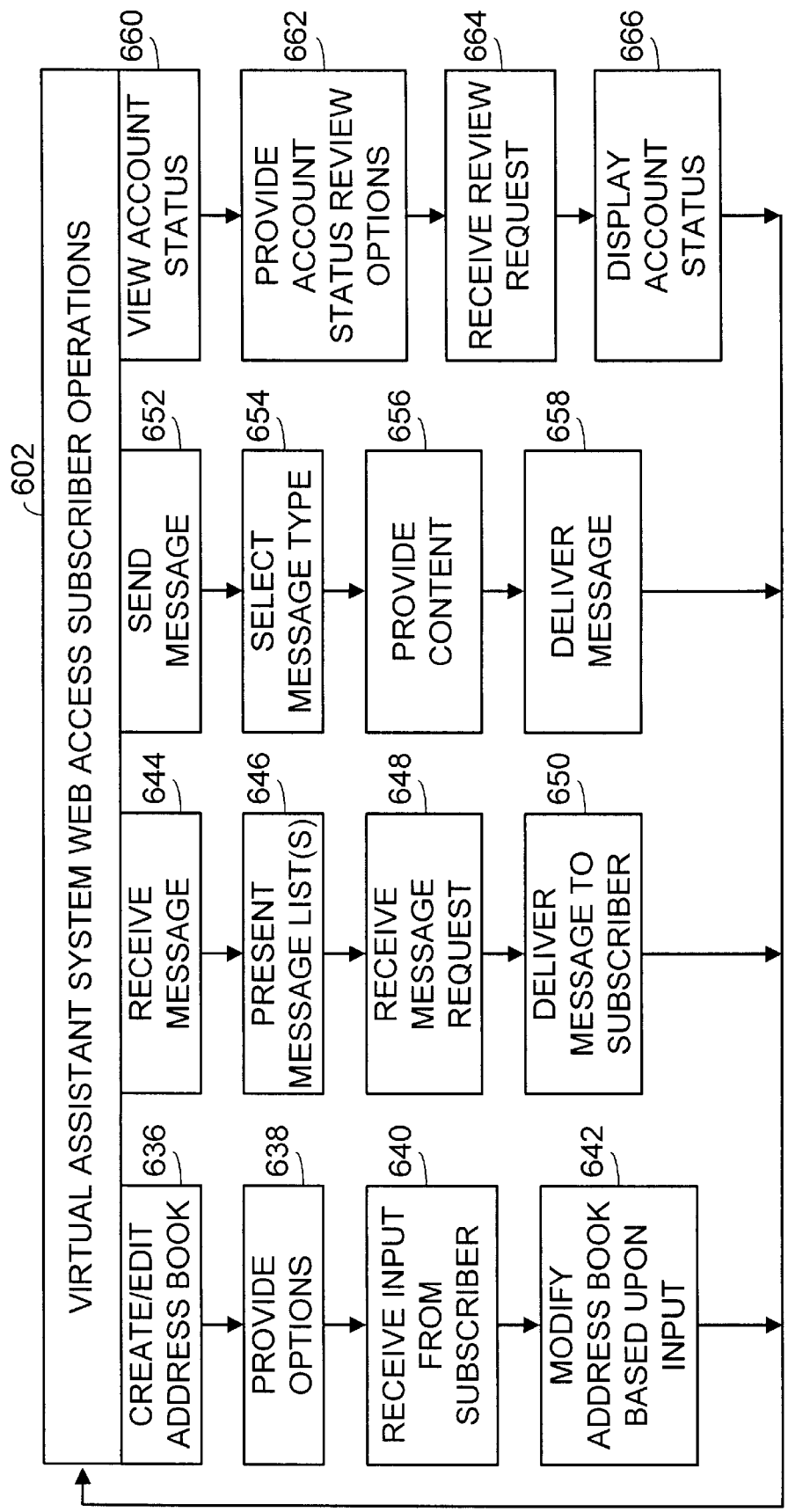

FIGS. 6A and 6B are logic diagrams illustrating operations of the virtual assistant system that are provided to a subscriber via a data network, e.g., the Internet or an Intranet. VAS access via the coupled data network is referred to as "Web Access". FIGS. 6A and 6B illustrate operations that may be accomplished via a Web Access. Referring now particularly to FIG. 6A, a subscriber may initiate a help operation via Web Access (step 604). In such case, the VAS receives the help request from the subscriber (step 606) and the VAS provides help information based upon the help request (step 608). As a part of this operation, the VAS may display one or more web pages to the subscriber that list the help topics available to the subscriber. As a further option, the VAS may allow the user to interact directly with an attendant.

When using Web Access to operate the VAS, the subscriber will typically be required to login to the VAS (step 610). When logging in, a login web page is displayed to the subscriber in which the subscriber is prompted for his or her password. The subscriber enters his or her password and the VAS receives the login request (step 612). Upon receipt, the VAS validates the login request (step 614) and, if valid, provides the subscriber with access to the VAS (step 616).

If the subscriber has forgotten his or her password (or personal number, as the case may be), the VAS provides a web page that allows the subscriber to contact customer service. If the subscriber successfully logs in, the VAS provides a "home page" to the subscriber that is based upon the options the subscriber has signed up for and based upon his or her selected profile information. This home page will typically provide icons that allow the subscriber to (1) modify his or her profile; (2) manage calls; (3) access/modify his or her address book; (4) access his or her messages using the message center; and (5) view his or her account status. Of course, additional options may also be displayed on the subscriber's home page.

The VAS allows a subscriber to alter his or her profile using Web Access (as well as telephone access, which was previously described with reference to FIG. 5B). When a user desires to modify his or her profile (step 618), the VAS provides profile options to the subscriber (step 620). The subscriber then provides a profile alter request to the VAS (step 622) and the VAS alters the subscriber's profile based thereupon. The user's profile includes a variety of categories, which include (1) subscriber preferences; (2) rate plan information; (3) reach lists; (4) schedules; and (5) passwords, among other types of information.

Generally speaking, subscriber preferences include personal information, Fax setup information and pager setup information. Rate plan information identifies the types of services that the VAS will provide for the.subscriber. Rate plans may be setup according to sets of services and/or may be customized for the particular subscriber. A rate plan information web page will provide the user with his current rate plan, including costs and services, and may provide the subscriber with information regarding adding additional services and the prices associated with each.

The reach lists for the subscriber allows the subscriber to setup and modify his or her find-me/follow-me services. Typically, the reach list includes a plurality of entries and associated times/dates for the entries. For example, a reach list will provide the subscriber's business contact information (voice line, Fax line, IP telephony address, email address, etc.) and the hours at which the subscriber is expected to be reachable at these contact points. The reach list will also typically include the subscriber's home contact information and the times at which the subscriber desires to receive communications at home. Further, the reach list will also include traveling information for the subscriber, e.g., cell phone number, satellite phone number, temporary Fax number, etc., at which the subscriber may be available while traveling. Associated with the reach list is the schedule, which activates and alters the reach list. Because the reach list and the schedule is easily accessible by either telephone or the Internet, the subscriber may alter the information as he or she desires to update the reach lists.

In a particular example of operation of the VAS, the subscriber establishes/alters his or her personal information. The personal information includes the name of the subscriber, the home address of the subscriber, the home phone number of the subscriber, the subscriber's VAS personal number, the subscriber's work phone number, the subscriber's mobile phone number, the subscriber's pager number, the subscriber's email address and the subscriber's personal IP address. The subscriber may alter any of this information from a personal information page provided by the VAS.

A Fax setup page allows the subscriber to establish and alter Fax preferences. These preferences include a preferred Fax number, a number of attempts to make in delivering a Fax and may include alternate Fax numbers and schedules for each of the Fax numbers. A pager setup page allows the subscriber to establish and alter pager preferences. These preferences include a pager number, the type of pager, e.g., alpha-numeric or numeric, whether to provide pager notification upon receipt of email, whether to provide pager notification upon receipt of Faxes, whether to provide pager notification of voice mail and additional pager options. The pager setup page may also support automated setup for particular types of pagers.

Also provided with the profile information is a rate plan web page. This web page allows a subscriber (or a user initiating service) to select form a basic plan, predefined packages of services or a customized service package. This web page will also provide cost of service indications to the subscriber. By allowing the subscribers to establish service using the Web Access, overhead costs are significantly reduced while accuracy in service establishment is maximized.

As was previously described in some detail, the VAS provides find-me/follow-me services for subscribers. The subscriber sets this information up as part of his or her profile and may modify it at any time using one or more web pages. A first web page allows the subscriber to setup and manage his or her reach list. The list of telephone numbers and IP numbers (IP network addresses) used to locate a subscriber is called a reach list. In one embodiment of the VAS, the subscriber may establish up to four reach lists. In this embodiment, the reach lists are tried in sequential order when the VAS attempts to locate the subscriber. The web page interface allows a subscriber to establish these reach lists. In the embodiment, the web page employs pull down menus with contact phone numbers and addresses that were previously provided in the personal information page.

The VAS supports scheduling of reach lists. In establishing this scheduling, the VAS provides the subscriber with a scheduling web page that allows the subscriber to enter schedules for each of the reach lists. For example, if a subscriber can schedule one reach list for business hours, one reach list for after business hours, and a third reach list for weekends. If no reach list is scheduled, the VAS sill simply forward all incoming calls to a message service. Further, in such case, the VAS will typically not provide notification of incoming communications. The VAS also supports overriding reach lists. In overriding a reach list, the find-me/follow-me service may be modified temporarily without a required modification of a reach list. This feature is particularly useful when the subscriber alters his or her normal schedule.

Finally, the VAS allows the user to alter his or her password using Web Access. In this operation, the VAS displays a change password web page to the user, which allows the subscriber to alter his or her password. In a contemplated embodiment, the web page requires that the subscriber provide his or her old password if he or she desires to create an new password.

A subscriber may also manage calls using Web Access (step 626). In managing calls, the VAS provides options to the subscriber that the subscriber may select to manage a call (step 628). The subscriber then provides input to the VAS (step 630) and the VAS performs the requested task(s) (step 632). In managing calls, the subscriber may initiate a point-to-point call, initiate an audio conference call or initiate a video conference call.

To initiate a point-to-point call the subscriber enters either a telephone number or an IP address corresponding to a person he or she would like to call. The subscriber may enter the number from a keypad/keyboard, via a voice recognition system, from a GUI, from a pull-down menu (generated from an address book of the subscriber) or in another manner. Once the subscriber selects the telephone number or IP address, he or she initiates the call via a GUI pushbutton or keystroke and the VAS initiates the point-to-point call.

Two types of conference calls are supported by the VAS, on-demand audio conferencing and pre-scheduled video conferencing. Further, the VAS supports both audio conferencing and video conferencing. A web conference setup web page receives contact information for the subscriber as well as all other participants for the conference. The subscriber enters telephone numbers or IP addresses for each of the participants and then clicks on a GUI pushbutton to initiate the call. In another usage, the subscriber may preschedule a video conference for a later time.

Referring now to FIG. 6B, the VAS supports address book operations. The subscriber may therefore create/edit his or her personal address book (step 636). When the subscriber initiates these address book operation, the VAS provides options to the subscriber for creating/editing the address book (step 638). Based upon these options, the subscriber provides input to the VAS (step 640) and the VAS creates or modifies an entry in the address book accordingly (step 642).

The personal address book contains a list of contacts that are used in managing calls and messages. Contacts may be added, viewed, deleted, or grouped into address groups. The VAS provides a web page for accessing and modifying entries. Information for each contact may include. (1) contact name; (2) voice activation nickname; (3) email address; (4) office phone number; (5) home phone number; (6) mobile phone number; (7) pager number; (8) Fax number; and (9) home address.

Address book functions supported by the VAS include: (1) adding a new contact; (2) deleting a contact; (3) modifying a contact; (4) viewing a contact's information; (5) searching for a contact; and (6) adding a new contact group, e.g., business, personal, etc. Address book functions also allow a subscriber to access information for other subscribers, such information input by the other subscribers. However, a subscriber may opt out from listing in the "white pages" of subscribers.

Still referring to FIG. 6B, a subscriber may access his or her messages after logging into the VAS (step 644). When the function is initiated, the VAS presents a listing of messages received for the particular subscriber (step 646). In a contemplated construction, a message center web page shows folders into which the messages are organized. For example, the folders may include an Inbox folder for all new messages, a Deleted folder for all deleted messages, and a FaxBack folder for Fax messages that are available for non-subscribers to access. Of course, other folder structures may be setup by the subscriber for his or her particular use by creating folders and deleting folders. To select a particular folder, the subscriber simply double clicks on the folder icon or uses a pull-down menu.

With the particular desired folder selected, the subscriber requests delivery of one or more selected messages (step 648). Based upon the request, the VAS delivers the requested messages to the subscriber (step 650). The delivery of each type of message, e.g., email, voice mail, Fax, etc., requires differing terminal equipment and transmission paths. While email messages are read directly using Web Access, voice mail may either be sent to the subscriber's current terminal equipment (if supported) or the VAS may initiate a call to the subscriber's telephone (based upon the subscriber's reach list) for delivery. Faxes may be viewed, forwarded to a single Fax number, or broadcast to multiple Fax numbers. Faxes may also be placed in the subscriber's Fax Back folder for later viewing by other subscriber's or non-subscribers.

The subscriber may also send a message using web access. The subscriber may send an email message, a voice mail message, a Fax or another type of message supported by the VAS. When the subscriber initiates a message (step 652), he or she first selects the message type (step 654), e.g., voice mail, email, Fax, etc. The VAS then prompts the subscriber for content and the subscriber provides the content to the VAS (step 656). In the case of an email message, the user may provide text input, may attach files, and/or may provide other content that is generally known. To initiate a voice mail message, the VAS prompts the user to initiate the recording of a message at his current terminal equipment (that must be voice enabled). In the case of a Fax message, the VAS prompts the subscriber for scanning of a document, to identify a file that contains a previously scanned document, or to identify a file that will be converted to a Fax. Once completed, the VAS delivers the message (step 658).

Still referring to FIG. 6B, the VAS also allows the subscriber to view his or her account status via the Web Access (step 660). Upon such an access, the VAS provides the subscriber with account status review options (step 662). In the contemplated embodiment, the subscriber may view his or her transactions, his or her unbilled charges, and his or her current bill/charges. The VAS then receives the subscriber's review request (step 664) and displays the corresponding account status (step 666).

Figure 7A:
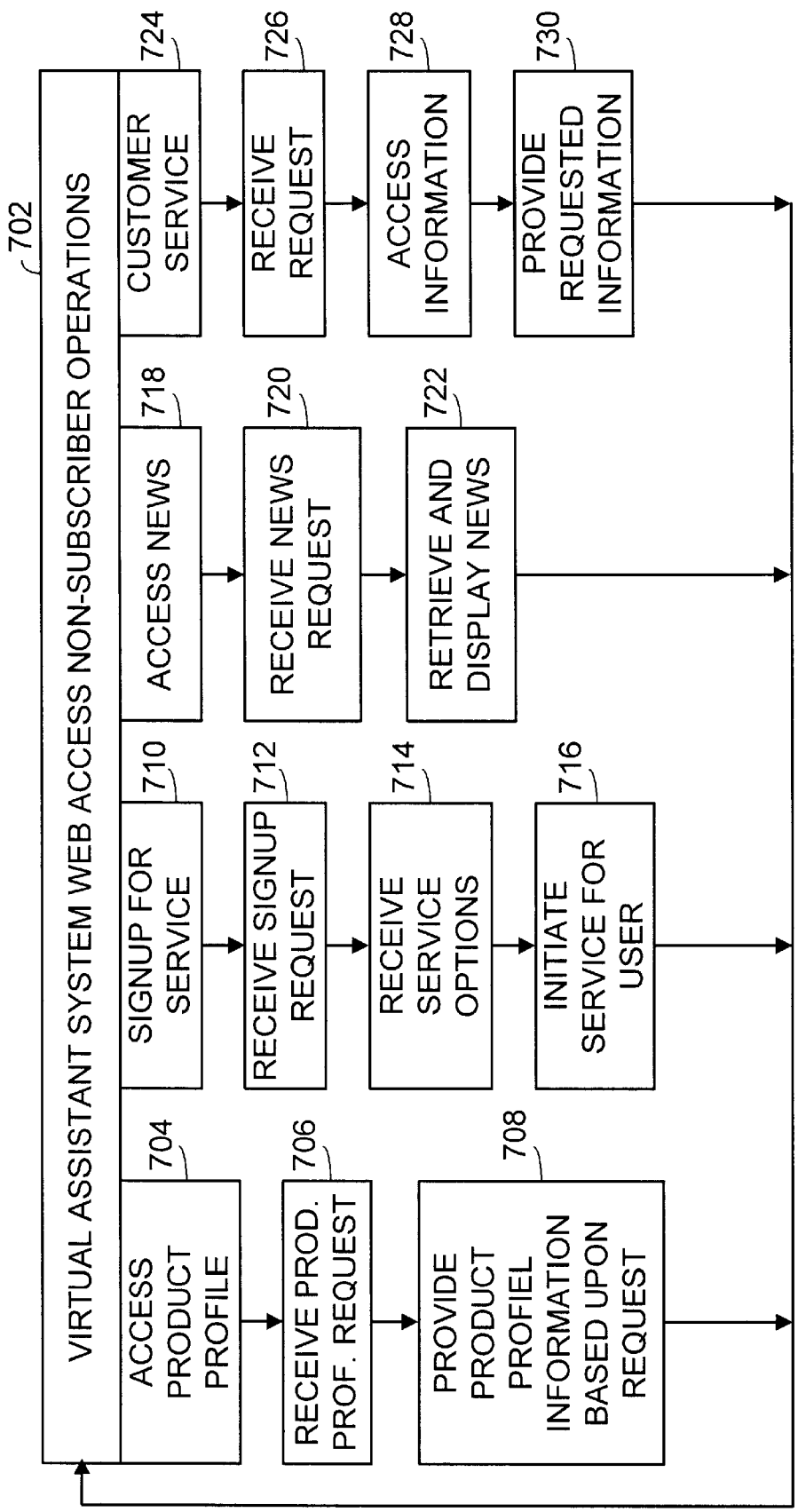
FIG. 7A is a logic diagram illustrating operations of the virtual assistant system that are provided to a non-subscriber via a data network.

FIG. 7A is a logic diagram illustrating operations of the virtual assistant system that are provided to a non-subscriber via a data network, e.g, Web Access. As a first operation, a non-subscriber may access the product profile for the VAS (step 704). In such case, the VAS provides a general product profile web page to the non-subscriber and the VAS then receives a product profile request from the non-subscriber (step 706). Based upon the request, the VAS provides product profile information (step 708).

The non-subscriber may also signup for service using Web Access (step 710). In such case, the VAS receives a signup request from the non-subscriber (step 712). During the signup process, the VAS receives service option requests from the potential subscriber (step 714). Once the service option requests have been received, the VAS initiates service for the non-subscriber (step 716). Subsequent to initiation of service, the non-subscriber becomes a subscriber and may login to the VAS to receive the services requested. During signup, the subscriber arranges for payment. In the contemplated embodiment, each subscriber pays via credit card, debit card, direct withdrawal or another method that minimizes risk to the service provider of non-payment. However, in another operation, in which services are provided to all employees of a particular company, the VAS may bill the company directly for all employees who become subscribers.

The non-subscriber may also access news relating to the VAS (step 718). In such case, the non-subscriber provides a request for particular news to the VAS (step 720) and, based upon the request, the VAS retrieves the news and displays it to the non-subscriber (step 722). Further, if the non-subscriber requires information in addition to that which may be obtained from the web site, the non-subscriber may also access customer service (step 724). In such case, the VAS receives the request (step 728) and, based upon the request, either sends a message to a representative or accesses customer service information (step 728) and provides the requested information to the non-subscriber (step 730).

Figure 7B:
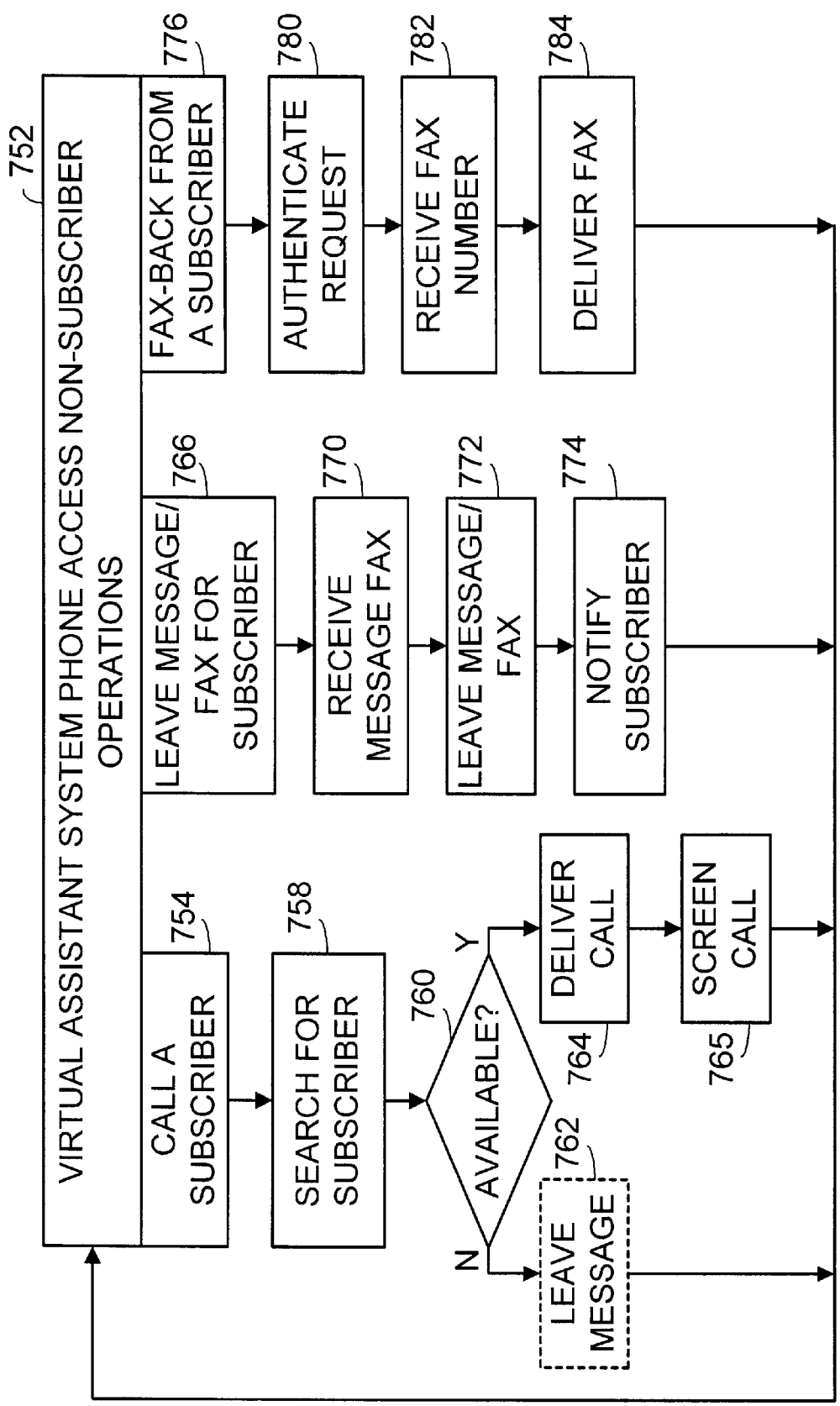
FIG. 7B is a logic diagram illustrating operations of the virtual assistant system. that are provided to a non-subscriber via a telephone network.

FIG. 7B is a logic diagram illustrating operations of the virtual assistant system that are provided to a non-subscriber via a telephone network (phone access). In a simplest operation, each subscriber has a single phone number. Any non-subscriber desiring to reach the subscriber for any purpose dials this number. However, when this number is dialed, the call is routed first routed to the VAS. Thus, all incoming calls, Faxes and other phone access operations are received by the VAS and initially processed.

When the VAS receives a call for a subscriber (step 754), it searches for the subscriber (step 758). Because the VAS receives phone calls, IP calls, Faxes and other types of communications for the subscriber, it must determine and locate the intended subscriber based upon the incoming communication. The VAS uses the subscriber's profile in an attempt to determine the location of the subscriber. If the subscriber is located, the VAS sends a message to the subscriber stating that a call has been received from the calling party (identified by the calling line ID) and asks the subscriber whether he or she would like to receive the call. If the subscriber is unavailable to the VAS or chooses not to accept the call (as determined at step 760), the call is routed to a message service where a message may optionally be left (step 762). If the subscriber is available to take the call (as determined at step 760), the VAS delivers the call to the subscriber (step 764) and the subscriber may then screen the call (step 765).

When the subscriber is unavailable, the caller may leave a message for the subscriber, e.g., voice mail. In another operation, the caller may desire not to speak with the subscriber but to only leave a message. Further, the caller may be a Fax machine or a computer that desires to leave a Fax for the subscriber (step 766). In such case, the VAS receives the message/Fax from the caller (step 770). Upon receipt, the VAS leaves the message/Fax for the subscriber (step 772) and, based upon the subscriber's profile, notifies the subscriber that the message/Fax has been received (step 774).

Another non-subscriber service provided by the VAS is the Fax-Back service in which a non-subscriber calls to receive a Fax left for the non-subscriber by a corresponding subscriber (step 776). When the non-subscriber calls the VAS, he or she calls the subscriber's telephone number. The VAS receives the call and provides a menu to the caller that allows the caller to access the Fax-Back service. When the caller requests the Fax-Back service, the VAS authenticates the request (step 780) and asks the caller for a Fax number for delivery of the Fax. The VAS then receives the Fax number (step 782) and delivers the Fax to the corresponding Fax number (step 784).

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A virtual assistant system that services communications for at least one subscriber, the virtual assistant system comprising:

a telephone network interface that couples the virtual assistant system to a telephone network, the telephone network interface operable to receive a call via the telephone network that is intended for a subscriber;

a data network interface that couples the virtual assistant system to a data network, the data network interface operable to receive a call via the data network that is intended for the subscriber;

a virtual assistant system core coupled to the telephone network interface and the data network interface;

a call services interface coupled to the virtual assistant system core that couples the virtual assistant system to a plurality of call services;

a message services interface coupled to the virtual assistant system core that couples the virtual assistant system to a plurality of message services;

a profile services interface coupled to the virtual assistant system core that couples the virtual assistant system to a plurality of profile services, wherein the profiles services interface determines a destination corresponding to the subscriber;

wherein the virtual assistant core is operable to forward a call notification to the subscriber via the telephone network interface when the destination corresponds to the telephone network;

wherein the virtual assistant core is operable to forward a notification to the subscribe via the data network interface when the destination corresponds to the data network; and when the subscriber accepts the call, the virtual assistant core services the call in conjunction with at least one of the telephone network interface and the data network interface.

2. The visual assistant system of claim 1, wherein:
the telephone network is a circuit switched network; and
the data network is a packet switched network.

3. The virtual assistant system of claim 1, wherein the call services include call placement and call receipt services.

4. The virtual assistant system of claim 3, wherein the call services further include coerce call setup and management services.

5. The virtual assistant system of claim 1, wherein the message services include voice mail services.

6. The virtual assistant system of claim 5, wherein the message services further include email services.

7. The virtual assistant system of claim 6, wherein the message services further include facsimile receipt, storage and delivery services.

8. The virtual assistant system of claim 7, wherein the message services further include multimedia messaging services.

9. The virtual assistant system of claim 1, wherein the profile services include reach list services that are used to deliver communication services to subscribers.

10. The virtual assistant system of claim 9, wherein the profile services further include scheduling services, wherein the scheduling services correspond to the reach list services.

11. The virtual assistant ten of claim 1, wherein the telephone network interface comprises a gateway.

12. The virtual assistant system of claim 1, wherein the data network interface includes a firewall.

13. The virtual assistant system of claim 1, wherein the virtual assistant system comprises a plurality of computer software instructions that are executed by at least one computer server.

14. The virtual assistant system of claim 1, wherein the virtual assistant system comprises a plurality of computer servers, each of which supports a service interface.

15. The virtual assistant system of claim 1, wherein:
the virtual assistant core is operable to provide an identification of a caller with the call notification; and
the virtual assistant system is operable to forward the call to the message services when the subscriber elects not to receive the call.

16. The virtual assistant system of claim 15, wherein when the call is an incoming facsimile, the virtual assistant core provides an option to the user to forward the call to a designated facsimile terminal that is identified by the profiles services interface.

17. The virtual assistant system of claim 1, wherein the virtual assistant system is operable to:
receive a communication from the subscriber;
interact with the message services to check messages for the subscriber;
interact with the subscriber to identify stored messages; and
deliver selected messages to the subscriber.

18. A virtual assistant system that services communications for at least one subscriber, the virtual assistant system comprising:
a telephone network interface computer server that couples the virtual assistant system to a telephone network, the telephone network interface operable to receive a call via the telephone network that is intended for a subscriber;

a data network interface that couples the virtual assistant system to a data network, the data network interface operable to receive a call via the data network that is intended for the subscriber;

at least one virtual assistant system computer sever coupled to the telephone network interface upon which the virtual assistant system runs that:
couples the virtual assistant system to a data network via the data network interface and to the telephone network via the telephone network interface;
provides core functions for the virtual assistant system;
couples the virtual assistant system to a plurality of call services;
couples the virtual assistant system to a plurality of message services; and
couples the virtual assistant system to a plurality of profile services;

wherein the virtual assistant system detennines a destination corresponding to the subscriber;

wherein the virtual assistant system is operable to forward a call notification to the subscriber via the telephone network interface when the destination corresponds to the telephone network;

wherein the virtual assistant system is operable to forward a notification to the subscriber via the data network interface when the destination corresponds to the data network; and when the subscriber accepts the call, the virtual assistant system services the call in conjuntion with at least one of the telephone network interface and the data network interface.

19. The virtual assisant system of claim 18, wherein:
the telephone network is a circuit switched network; and
the data network is a packet switched network.

20. The virtual assistant system of claim 18, wherein the call services include call placement and call receipt services.

21. The virtual assistant system of claim 20, wherein the call services further include conference call setup and management services.

22. The virtual assistant system of claim 18, wherein the message services include voice mail services.

23. The virtual assistant system of claim 22, wherein the message services further include email services.

24. The virtual assistant system of claim 23, wherein the message services further include facsimile receipt, storage and delivery services.

25. The virtual assistant system of claim 24, wherein the message services further include multimedia messaging services.

26. The virtual assistant system of claim 18, wherein the profile services include reach list services that are used to deliver communication services to subscribers.

27. The virtual assistant system of claim 26, wherein the profile services further include scheduling services, wherein the scheduling services correspond to the reach list services.

28. The virtual assistant system of claim 18, wherein the telephone network interface computer server comprises a gateway to the telephone network.

29. The virtual assistant system of claim 18, wherein the at least one virtual assistant system computer server includes a firewall server that couples to a data network.

30. The virtual assistant system of claim 18, wherein the at least one virtual assistant system computer server comprises a plurality of computer servers, each of which sports a respective virtual assistant system function.

31. The virtual assistant system of claim 18, wherein:

the virtual assistant system is operable to provide an identification of a caller with the call notification; and the virtual assistant system is operable to forward the call to the message services when the subscriber elects not to receive the call.

32. The virtual assistant system of claim 31, wherein when the call is an incoming facsimile, the virtual assistant core provides an option to the user to forward the call to a designated facsimile terminal that is identified by the profiles services interface.

33. The virtual assistant system of claim 18, wherein the virtual assistant system is operable to:

receive a communication from the subscriber;

interact with the message services to check messages for the subscriber;

interact with the subscriber to identify stored messages; and deliver selected messages to the subscriber.

\* \* \* \* \*

UNITED STATES PATENT AND TRADEMARK OFFICE
CERTIFICATE OF CORRECTION

| | |
|---|---|
| PATENT NO. | : 6,625,258 B1 |
| APPLICATION NO. | : 09/472627 |
| DATED | : September 23, 2003 |
| INVENTOR(S) | : Geetha Ram, Lien K. Tran and Charles G. Roberts |

It is certified that error appears in the above-identified patent and that said Letters Patent is hereby corrected as shown below:

In the Claims:

In Column 19, line 14, Claim 1, replace "subscribe" with --subscriber--.

Signed and Sealed this
Eighteenth Day of June, 2013

Teresa Stanek Rea
*Acting Director of the United States Patent and Trademark Office*